US00RE37894E

(19) United States
(12) Reissued Patent
MacNeil

(10) Patent Number: US RE37,894 E
(45) Date of Reissued Patent: Oct. 22, 2002

(54) LACROSSE STICK HEAD

(75) Inventor: Ronald J. MacNeil, Milton (CA)

(73) Assignee: Shamrock Lacrosse, Inc., Summit, NJ (US)

(21) Appl. No.: 09/030,702

(22) Filed: Feb. 25, 1998

Related U.S. Patent Documents

Reissue of:
(64) Patent No.: 5,494,297
Issued: Feb. 27, 1996
Appl. No.: 08/285,125
Filed: Aug. 2, 1994

(51) Int. Cl.[7] ..... A63B 59/02; A63B 65/12
(52) U.S. Cl. ..... 473/513
(58) Field of Search ..... 473/513

(56) References Cited

U.S. PATENT DOCUMENTS 3,507,495 A * 4/1970 Tucker et al.
4,022,477 A * 5/1977 Pool
4,049,273 A * 9/1977 Pool
D248,679 S * 7/1978 Rule
4,270,756 A * 6/1981 Ahlenfeld et al.
4,358,117 A * 11/1982 Deutsch
D273,601 S * 4/1984 Lewis, Jr. et al.
D277,691 S * 2/1985 Rule
D297,963 S * 10/1988 Tucker et al.
4,861,042 A * 8/1989 Trettin
4,938,480 A * 7/1990 Lods
5,035,434 A * 7/1991 Taylor et al. ..... 473/513
5,037,112 A * 8/1991 Brine, III et al.
5,048,843 A * 9/1991 Dorfi et al. ..... 273/326
5,054,790 A * 10/1991 Brine, III et al.
5,067,726 A * 11/1991 Brine, III et al. ..... 273/326
5,080,372 A * 1/1992 Brine, III et al.
5,178,397 A * 1/1993 Brine, III et al.

FOREIGN PATENT DOCUMENTS

CA 880467 * 9/1971 ..... 273/326

OTHER PUBLICATIONS

Committee Meeting Minutes—May 15, 1983—NCAA Hall of Fame.*

* cited by examiner

*Primary Examiner*—Paul T. Sewell
*Assistant Examiner*—M. Chambers
(74) *Attorney, Agent, or Firm*—Obermayer Rebmann Maxwell & Hippel LLP

(57) ABSTRACT

A lacrosse stick head comprising a frame and netting attached to the frame. The frame has two sidewalls extending from a throat portion to a mouth portion thereof. Each sidewall includes an upper wall section and a lower section having an inner wall segment, that extends inwardly towards the central longitudinal axis of the frame, and an other wall segment that extends downwardly from the upper wall section. The inner wall segment is shorter than the outer wall segment and spaced a selected distance away from the mouth portion. Each outer wall segment has a bottom edge with holes therein, those holes being provided to attach the netting. In a preferred version, there are several side-by-side holes arranged in a row along one or both sides of a shank end portion of the head. These holes are used to secure and adjust several longitudinal thongs of the netting.

9 Claims, 4 Drawing Sheets

LACROSSE STICK HEAD

Matter enclosed in heavy brackets [ ] appears in the original patent but forms no part of this reissue specification; matter printed in italics indicates the additions made by reissue.

BACKGROUND OF THE INVENTION

This invention relates to lacrosse sticks and, in particular, lacrosse stick heads formed with netting.

Lacrosse sticks are used in the sport of lacrosse which has been played for quite some time. Originally and for many years, the sticks for this sport were made from a suitable wood while the netting in the stick head was made and continues to be made from leather thongs intertwined with and connected to smaller thongs, cords or laces or from a nylon mesh. The typical head frame includes a throat portion or shank end portion to which a stick handle is affixed, one or two sidewalls extending from the throat portion and a lip portion or transverse wall that is connected to the outer end of a single sidewall or both outer ends of two sidewalls. The head frame supports the flexible netting which defines a ball pocket, traditionally located in the midsection or mouth area of the head.

In the course of playing the sport of lacrosse, a player who has caught a ball with his stick typically carries the ball in the ball pocket. The throat area is relatively narrow compared to the rest of the head and thus is able to more securely retain the ball.

U.S. Pat. No. 4,270,756 issued Jun. 2, 1981 to Carl Ahlenfeld et al. describes a fairly typical lacrosse stick head having a pair of sidewalls diverging in a generally V-shaped manner from a throat area, a top portion joining the side walls, and a substantially transverse member extending between the sidewalls in the throat area. The conventional lacing used in this stick head comprises four longitudinally extending rawhide or leather thongs which are connected to the head by means of holes formed in the top or lip portion and holes in the region of the throat. Lacing or cord is intertwined between these thongs and is connected to the sidewall by holes formed therein.

Recent U.S. Pat. No. 5,035,434 issued Jul. 30, 1991 to Sports Licensing, Inc. describes a lacrosse stick head including a frame and netting attached thereto. There are two sidewalls that extend from the throat portion and diverge from one another. The opening formed by the frame can be described as generally pear-shaped. The preferred material for this frame is a substantially rigid, light weight plastic, such as nylon or polyurethane. The frame of this patent specification is shown with longitudinally extending ribs or ridges formed on the outside of the sidewalls.

Recent U.S. Pat. No. 5,080,372 issued Jan. 14, 1992 to Sports Licensing, Inc. describes a lacrosse stick head with inwardly extending side rib means on an interior surface of the sidewall. These ribs means are disposed, at least in part, proximate an upper edge of the sidewall and overlay the ball pocket. The preferred rib means are moulded integrally with the sidewalls and extend substantially normal to the interior surfaces of these walls. These known rib means are said to add rigidity to the sidewalls and to provide a ball retention aid because they overlay the netting in the vicinity of the ball pocket.

It is an object of the present invention to provide an improved lacrosse stick head having a frame and a netting wherein the two sidewalls each have a lower section having an inner wall segment, that extends inwardly, and an outer wall segment that extends downwardly. The inner wall segment acts to strengthen and reinforce the sidewall and can, in the preferred version of the stick head, provide other advantages state hereinafter.

It is a further object of the present invention to provide an improved lacrosse stick head having an improved hole arrangement for securing and adjusting longitudinally extending thongs that form a major part of the netting, these holes being arranged side-by-side along one or both sides of the shank end.

*It is a further object of the invention to provide an improved lacrosse stick head in which the end of the lacrosse head is below that of the throat.*

SUMMARY OF THE INVENTION

According to one aspect of the invention, a lacrosse stick head comprises a frame having a central longitudinal axis and netting attached to the frame. The frame comprises sidewall means extending from a throat portion of the frame to a mouth portion thereof and located on two opposite sides of the frame. The sidewall means on each side include an upper wall section and a lower section having an inner wall segment, that extends inwardly towards the longitudinal axis, and an outer wall segment that extends downwardly from the upper wall section. The inner wall segment is shorter than the outer wall segment and spaced a selected distance away from the mouth portion. Each outer wall segment has a bottom edge and holes therein approximate the bottom edge. The holes are provided for attaching the netting to the sidewalls.

According to another aspect of the invention, a lacrosse stick head comprises a frame having a central longitudinal axis, which frame includes sidewall means, a shank end portion connected to the sidewall means, and a transverse end wall connected to the outer end of the sidewall means. Netting, which is attached to the frame, includes several longitudinal thongs. A first set of holes is distributed along the end wall for connecting outer ends of the thongs to the end wall. A second set of holes is formed in or by the shank end portion for connecting inner ends of the thongs to the shank end portion. This second set includes several side one or two sides of the shank end portion. At least two of the side holes are located side-by-side on one side of the shank end portion. There is a respective one of the side holes for each of the longitudinal thongs and the one or two sides of the shank end portion having these side holes extend generally in the longitudinal direction of the stick head.

According to a further aspect of the invention, a lacrosse stick head comprises a frame and netting attached to the frame. The frame comprises a throat portion, first and second side walls extending from the throat portion and diverging from each other, a lip portion joined to ends of the sidewalls remote from the throat portion. The first sidewall is substantially straight in the longitudinal direction at least along an upper edge thereof. The second sidewall forms a convex curve extending in the longitudinal direction of the sidewall at least along an upper edge thereof with this convex curve facing towards the central longitudinal axis of the frame. The frame is made of strong, rigid plastics material.

A frame provided with inner and outer wall segments in the lower section can be provided with string attaching holes extending along each segment. This enables the user of this stick head to have a choice between stringing the lacing or cords to either the inner wall segment or the outer wall segment. The latter arrangement will allow a shallow ball pocket with good ball control and a fast release. However, if he attaches the lacing or cords to the inner wall segments, the user will obtain a deeper and narrower pocket and the stick will have a slower ball release (although more ball control).

If the stick head is provided with several side-by-side holes arranged in a row along one side of the shank end, these holes can be used to connect the inner ends of the thongs to the shank end portion of the frame. Locating the connecting holes in this manner makes it easier to adjust the length of the leathers or thongs prior to play or during play.

It will be understood that the accompanying drawings illustrate a particular device embodying the invention and these drawings are provided by way of illustration only and not as a limitation of the invention. The principles and features of this invention may be employed in various and numerous embodiments without departing from the scope of the invention.

DETAILED DESCRIPTION OF THE PREFERRED EMBODIMENT

Figure 1:
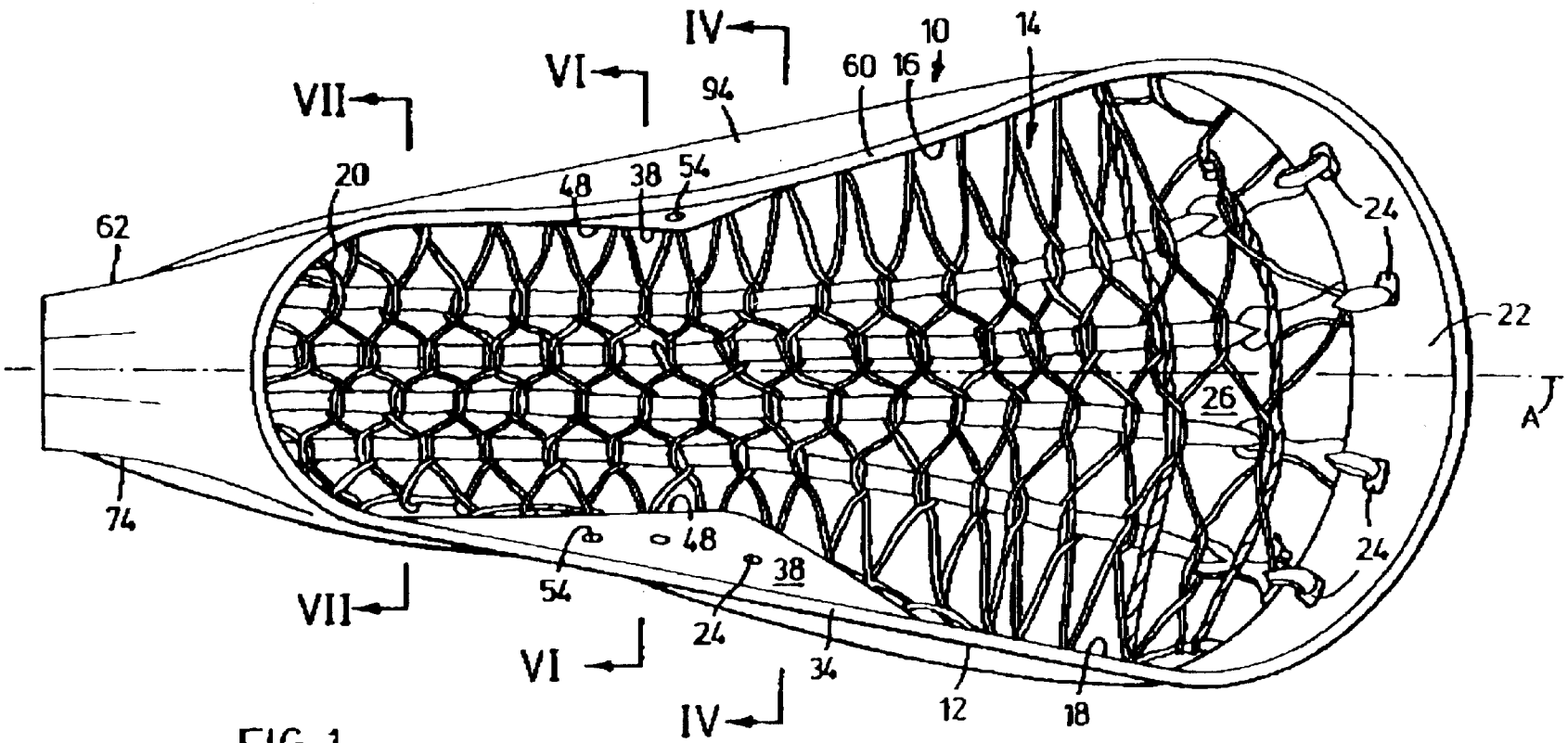
FIG. 1 is a top plan view of one form of lacrosse stick head illustrative of the invention.

As shown in FIG. 1, a lacrosse stick head 10 constructed in accordance with the invention comprises a frame having a central longitudinal axis indicated at A and a netting 14 attached to the frame. The frame includes sidewall means in the form of two sidewalls 16 and 18 which extend from a throat portion 20 of the frame to a mouth portion 22 thereof. The frame 12 can be made of wood but preferably is injection moulded using a strong rigid plastics material. A suitable plastics material is a tough nylon resin such as that sold under the trademark ZYTEL by Dupont. This preferred nylon resin is thermoplastic polyamide which withstands repeated impact and is highly resistant to abrasion and most chemicals. The sidewalls 16 and 18 and the lip or mouth portion 22 are provided with holes 24 in which are disposed portions of the netting 14. The netting is thus attached to and retained by the frame 12 so as to close off the large opening 26 surrounded by the frame and prevent a ball from passing through the stick head. The netting preferably includes longitudinally extending leather strips or thongs 28 with the illustrated embodiment having four such thongs. These thongs are interconnected by smaller lacing or cords 30 in a known manner. The laces or cords are connected to the sidewalls 16 and 18.

Figure 3:
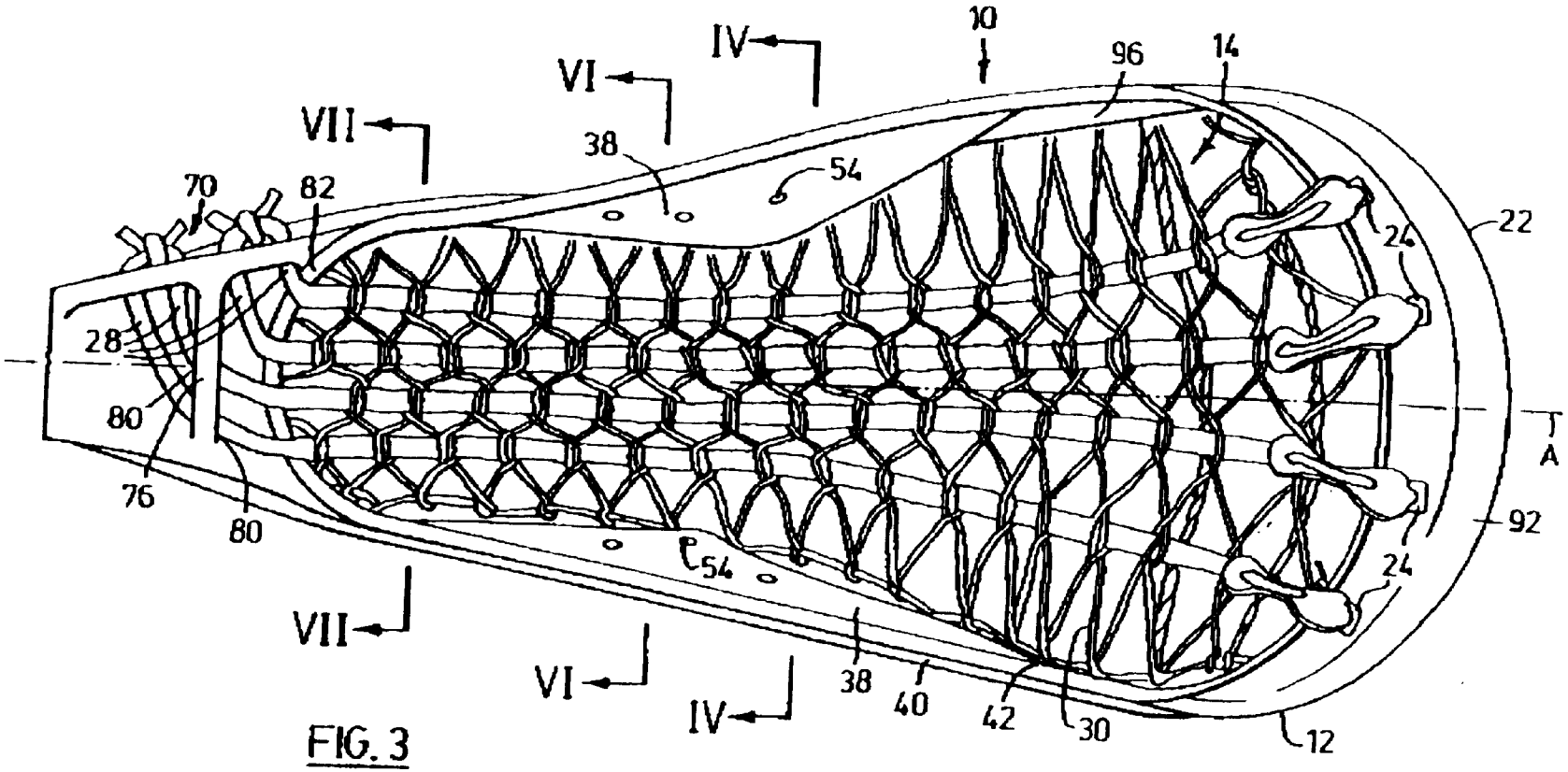
FIG. 3 is a bottom view of the lacrosse stick head.
Figure 4:
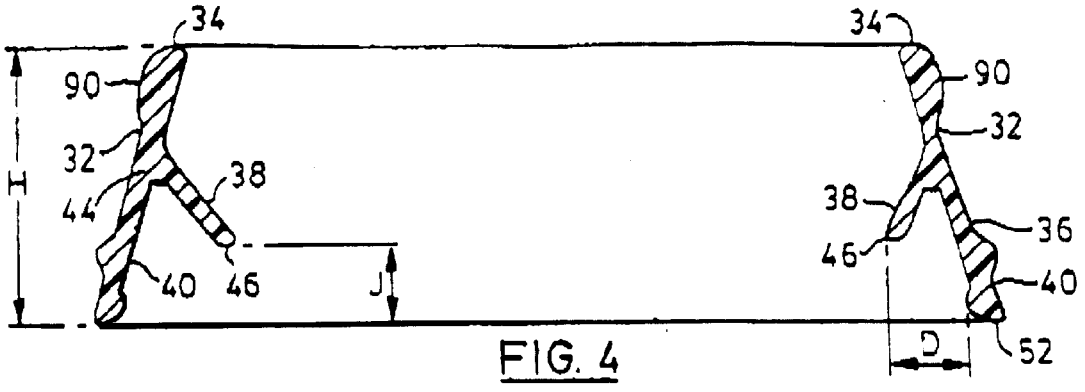
FIG. 4 is a cross sectional view taken along the line IV—IV of FIG. 1.
Figure 6:
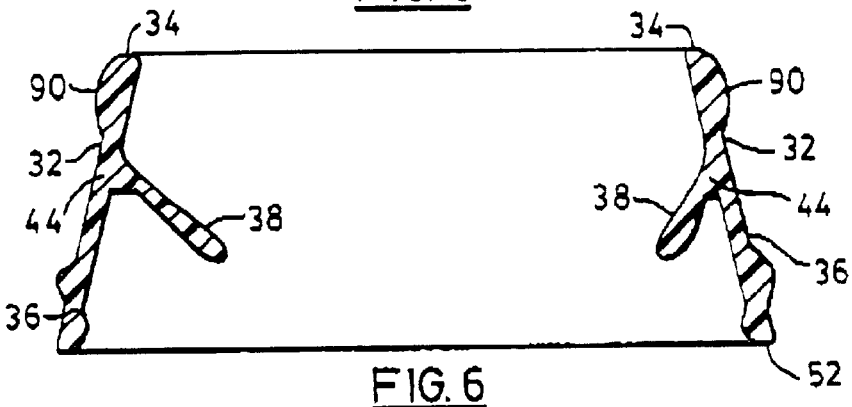
FIG. 6 is a cross-sectional view taken along the line VI—VI of FIG. 1.
Figure 7:
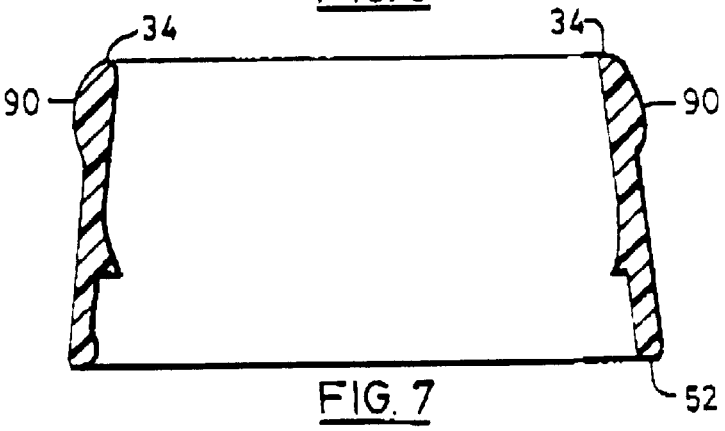
FIG. 7 is a further cross-sectional view taken along the line VII—VII of FIG. 1.

The construction of the sidewalls will now be described with reference to FIGS. 1, 3, 4, 6 and 7. Each sidewall includes an upper wall section 32 that extends downwardly from an upper edge 34 to a lower section indicated generally by 36. At least in a longitudinal central portion of the frame, the lower section 36 has an inner wall segment 38 that extends generally inwardly towards the aforementioned longitudinal axis A of the frame. The lower section also has an outer wall segment 40 that extends generally downwardly from the upper wall section 32. The inner wall segment 38 is substantially shorter than the outer wall segment 40 as indicated in FIGS. 1 and 3. This is primarily due to the fact that inner wall segment terminates at 42, a selected distance away from the mouth portion 22. In the preferred illustrated embodiment, as shown in FIGS. 4 and 6, the inner wall segment 38 extends both inwardly and downwardly from a juncture 44 between it and the upper wall section. The inner wall segment terminates in an inner edge 46, a substantial portion 48 of which runs generally parallel to a portion of the opposite inner edge. In the preferred embodiment of the frame, the portions 48 are spaced apart a distance in the range of 2½ inches to 3 inches, preferably about 2⅞ths inches. As a standard lacrosse ball has a diameter of 2½ inches, it will be appreciated that the preferred distance between the two straight portions 48 of the inner wall segment is slightly more than the diameter of the ball and this permits the ball to move freely into and out of the throat portion of the head.

Both of the sidewalls 16 and 18 are formed with holes indicated generally at 50 through which lacing or cords for the netting 14 can be run and connected. In particular, each of the outer wall segments which run the entire length of the side wall have holes 50 therein proximate their bottom edge 52. Preferably, not only the outer wall segment but also the inner wall segment 38 has holes indicated specifically at 54 proximate the inner edge 46, the holes 54 being provided for optionally attaching the netting to the inner wall segments. Thus, a player using a preferred form of the present lacrosse stick is able to string the stick head using one or the other of the wall segments 38 and 40 in the region where both of these wall segments extend. By choosing to string the inner wall segment, the player will obtain a narrow pocket and extreme ball control. If, on the other hand, he strings the outer wall segment, he will obtain a wider pocket with less ball control and have the advantage of a faster ball release. In one preferred embodiment, the horizontal distance D shown in the cross-section of FIG. 4 from the inner edge 46 of the inner wall segment to the bottom edge of an adjacent portion of the outer wall segment was ⅞th inch. There is about the same horizontal distance between the inner edge 46 and the bottom edge 52 in the cross-section of FIG. 6. When seen from the front, the frame 12 is generally pear shaped (see FIG. 1) and has a narrow end section at the throat portion 20 and a substantially wider end section at the mouth portion. However, in the preferred illustrated embodiment, one of the sidewalls 18 is substantially straight in the longitudinal direction at least along its upper edge 34 while the second sidewall 16 forms a convex curve indicated at 60 extending in the longitudinal direction of the sidewall at least along its upper edge 34. The convex curve 60 faces towards the longitudinal axis A of the frame. In the illustrated preferred embodiment, it is the right sidewall which has the straight upper edge 34 (when the stick head is viewed from the front). The advantage of this sidewall configuration arises from the player's ability to retain the ball in the pocket longer. The straight side with upper edge 34 provides a player with better ball control on a face-off when the stick is laid flat on its side with the straight side of the head down and adjacent the ball.

Figure 5:
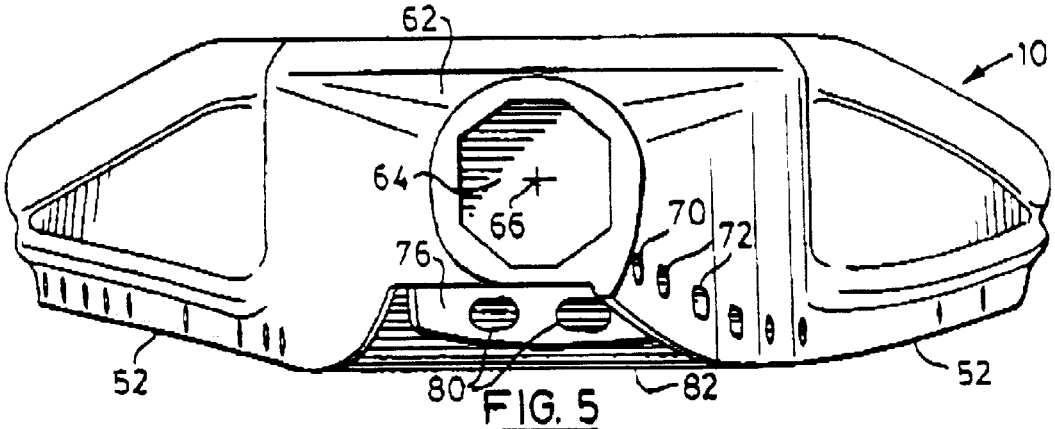
FIG. 5 is an end elevation showing the head frame only without its netting.

The head 10 has a shank end portion 62 to which the sidewalls 16 and 18 are connected as well as a tick handle (not shown). Located in the shank end portion is an octagonal aperture 64 for reception of the stick handle. This aperture has a central axis indicated at 66 in FIG. 5 which is preferably aligned with the central longitudinal axis A of the frame. The bottom edges 52 of the outer wall segments, which in a preferred embodiment are substantially straight, are generally parallel to this central axis 66 of the aperture. These bottom edges 52 are also generally parallel to an upper edge plane indicated at P in FIG. 2 defined by the upper edges 34 of the sidewalls in the region thereof adjacent the throat portion of the frame. By arranging the bottom edges of the outer side wall segments so that they are generally straight and parallel to the aforementioned plane, one permits the user of the stick to define where he wishes to have the pocket that is formed by the netting 14. The user is given the option of having the pocket near the mouth or lip portion of the head, in the middle of the head, or adjacent the throat portion 20. This flexibility is unlike any manufactured lacrosse stick heads that are made of plastic, which heads permit one only to have a pocket in or adjacent the throat of the head. Of course, this advantage is gained primarily when the netting is strung using the holes in the outer wall segments.

In order to attach the longitudinally extending thongs 28 there is a first set of holes 24 distributed along the end wall or mouth portion 22 of the frame. In one preferred embodiment, these holes are spaced about ⅛ inch from the bottom edge of the lip portion. There is a second set of holes indicated generally at 70 formed in or by the shank end portion 62 for connecting inner ends of the thongs 28 to the shank end portion. This second set includes several side holes indicated at 72 in FIGS. 2 and 5 which are arranged in a row along one side of the shank end portion 62. The holes 72 could also be arranged along two opposite sides of the shank end portion. At least two of the side holes 72 are located side-by-side on one side of the shank end portion. There is a respective one of these side holes for each of the longitudinal thongs. In the illustrated preferred embodiment, there are four such holes 72 for the four thongs. It will be particularly noted that the one side 74 or the two sides of the shank end portion where these holes are located extend generally in the longitudinal direction of the stick head although it may be at a small angle to the central longitudinal axis A. By arranging the holes 70 in this manner, the user can adjust the effective length of the leathers or thongs 28 from the side of the stick making adjustments easier to accomplish and simpler. In order to adjust the thongs, preferably they are pulled through the holes 70 until the thongs are at the desired length and then pairs of thongs are tied together at their inner ends to secure them at this length. Having the holes at the side of the shank end makes adjustment of the thongs easier because there is more room at the side of the stick head, leaving more room between the thongs, and because one is able to view the pocket of the stick when making the adjustment.

A preferred shank end portion of the head 10 is formed with a centrally located, transversely extending flange 76 that projects rearwardly from the shank end portion. The second set of holes 70 includes at least two holes 80 in this flange which serve to space thongs 28 extending through them in the transverse direction of the frame. The shank portion further includes a transversely extending, rearwardly projecting lip at 82 which is an extension of the sidewalls 16 and 18. All of the longitudinal thongs 28 pass over this lip or through holes formed in this lip and then bend downwardly so as to pass through the holes 70 including the side-by-side holes 72 located on one or both sides. It will be appreciated that the lip 82 not only acts to provide the proper depth to the netting in the region of the throat but also, to some extent, protects the flange 76.

Figure 2:
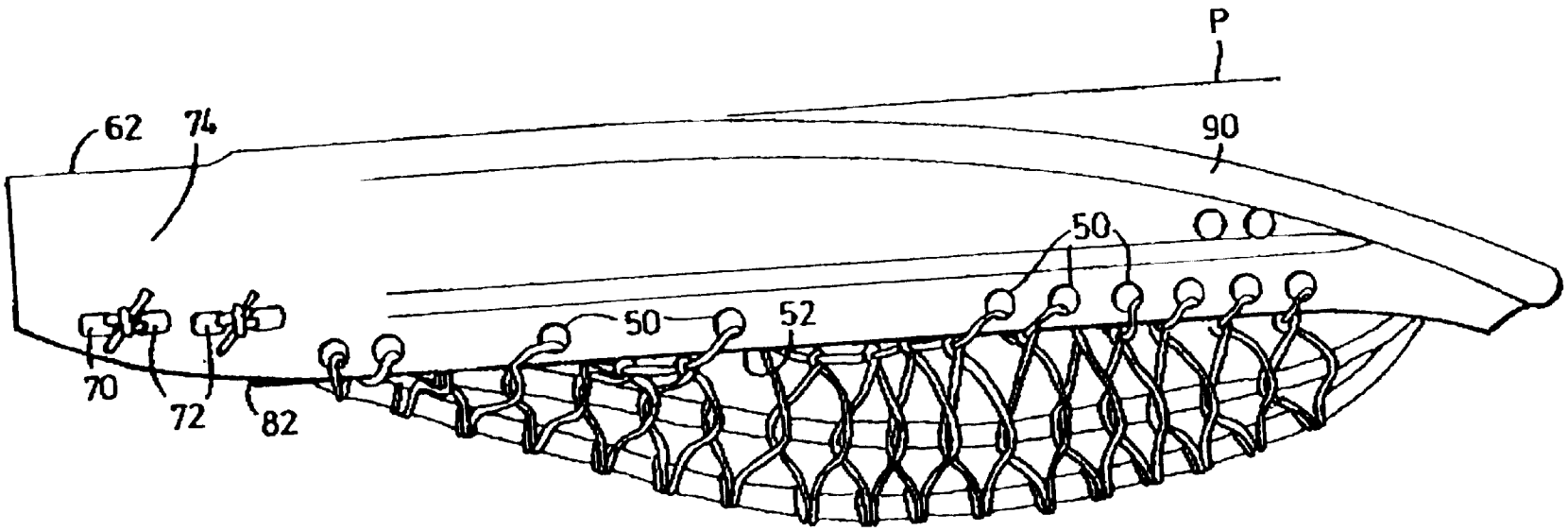
FIG. 2 is a side elevation of the lacrosse stick head shown in FIG. 1.

Also shown in FIGS. 2 and 4 is a preferred reinforcing rib 90 that extends along the outside of the sidewalls 16 and 18 and also extends around the rear of the lip portion 22 at 92 (see FIG. 3). In the region of the lip portion, this rib acts to protect the front ends of the thongs 28 at the rear of the head, reducing wear thereon. Also, like the sidewalls themselves, the rib 90 curves slightly downwardly or rearwardly towards the mouth portion 22 (see FIG. 2). *The mouth portion is thus below the shank end portion 62 and the central axis 66 of the head.*

Although the sidewalls can be constructed and arranged so that they are substantially the same, in one preferred embodiment the sidewall 16 along its bottom edge 52 will be located a short distance outwardly, for example ½ inch, from a vertical plane defined by the upper edge 34 of the sidewall. This slight outward projection is indicated at 94 in FIG. 1. The other sidewall 18 has a bottom edge 52 that projects inwardly a short distance, for example, ½ inch, from the vertical plane defined by its upper edge 34 along a portion of the length of the sidewall. This slight inward projection is indicated at 96 in FIG. 1. Also, although not illustrated in the drawings, it is possible to form one of the sidewalls with large openings or open spaces while still having the sidewall continuous from the throat portion to the lip portion. Typically, these open spaces would be formed in the left sidewall when the head is being viewed from the front (the upper sidewall 16 in FIG. 1).

In a preferred embodiment of the stick head, the height of the rib 90 measured from the upper edge 34 is about ½ inch. Also, the overall height of the sidewall indicated by the letter H in FIG. 4 is about 2 inches. The vertical distance J between the bottom edge 52 of the outer wall segment and the inner edge 46 of the inner wall segment is preferably ¼ inch although it can be more. The thickness of the outer wall segment 40 adjacent to the juncture 44 can be about ¼ inch. The preferred string holes 50 along the inner and outer wall segments are preferably elongate measuring about 5⁄16ths× 3⁄16ths inch.

It will be apparent to one skilled in the construction of lacrosse stick heads that various modifications and changes to the described and illustrated lacrosse stick head can be made without departing from the spirit and scope of this invention. Accordingly, all such modifications and changes as fall within the scope of the appended claims are intended to be part of this invention.

I therefore claim:

1. A lacrosse stick head generally pear shaped comprising a frame having a central longitudinal axis and netting attached to said frame, said frame made of strong rigid plastics material and injection moulded, comprising sidewall means extending from a throat portion of said frame to a mouth portion thereof and located on two opposite sides of said frame, *and a mouth portion, said mouth being below the central longitudinal axis of the frame,* said sidewall means on each side including an upper wall section and a lower section having an inner wall segment, that extends inwardly towards said longitudinal axis, wherein each inner wall segment extends both inwardly towards central longitudinal axis and downwardly from said upper wall section and has an inner edge and holes therein proximate said inner edge, said holes in the inner edge being provided for optionally attaching said netting to the inner wall segments, and an outer wall segment that extends downwardly from said upper wall section, said inner wall segment being shorter than said outer wall segment and spaced a selected distance away from said mouth portion, each outer wall segment having a bottom edge and holes therein proximate said bottom edge, wherein said holes are provided for attaching said netting to said sidewall means.

2. A lacrosse stick head according to claim 1 wherein inner wall segments extend both inwardly and downwardly from said upper wall section and has an inner edge and wherein substantial portions of the two inner edges are generally parallel to one another and are spaced apart a distance in the range of 2½ inches to 3½ inches.

3. A lacrosse stick head according to claim 2 wherein said substantial portions of the two inner edges are spaced apart a distance of about 2⅞ths of an inch.

4. A lacrosse stick head according to claim 2 wherein at least a portion of each inner edge of an inner wall segment is spaced inwardly from the bottom edge of an adjacent portion of the respective outer wall segment a distance of at least ½ inch.

[5. A lacrosse stick head comprising a frame having a central longitudinal axis and netting attached to said frame, said frame comprising a throat portion, first and second side walls extending from said throat portion and diverging from each other, said first sidewall being substantially straight in the longitudinal direction at least along an upper edge thereof, said second sidewall forming a convex curve extending in the longitudinal direction of the sidewall at least along an upper edge thereof, said convex curve facing towards said longitudinal axis, and a lip portion joined to ends of said sidewalls remote from said throat portion, wherein said frame is made of strong rigid plastics material.]

[6. A lacrosse stick head according to claim 5 wherein each inner wall segment extends both inwardly and downwardly from said upper wall section and has an inner edge and holes therein proximate said inner edge, said holes in the inner edge being provided for optionally attaching said netting to the inner wall segments.]

[7. A lacrosse stick head according to claim 6 wherein each inner wall segment extends both inwardly and downwardly from said upper wall section and has an inner edge and holes therein proximate said inner edge, said holes in the inner edge being provided for optionally attaching said netting to the inner wall segments.]

[8. A lacrosse stick head according to claim 6 wherein each inner wall segments extends both inwardly and downwardly from said upper wall section and has an inner edge and wherein substantial portions of the two inner edges are generally parallel to one another and are spaced apart a distance in the range of 2½ inches to 3½ inches.]

[9. A lacrosse stick head according to claim 6 wherein the outer wall segments have substantially straight bottom edges that are parallel to an upper edge plane defined by the upper edges of said sidewalls located in a region thereof adjacent and at said throat portion of said frame.]

[10. A lacrosse stick head according to claim 8 wherein said shank portion includes a transversely extending, rearwardly projecting lip which is an extension of the sidewall means, all of said longitudinal thongs passing over or through said lip and then through said side holes.]

[11. A lacrosse stick head according to claim 8 wherein said frame including said shank end portion is made of strong rigid plastics material and is injection moulded.]

12. A lacrosse stick head comprising a frame having a central longitudinal axis and netting attached to said frame, said frame comprising a throat portion, first and second side wall extending from said throat portion and diverging from each other, [said first sidewall being substantially straight in the longitudinal direction at least along an upper edge thereof,] said second sidewall forming a convex curve extending in the longitudinal direction of the sidewall at least along an upper edge thereof, said convex curve facing towards said longitudinal axis, and a lip portion joined to ends of said sidewalls remote from said throat portion, *said portion being below said central longitudinal axis and a top edge plane of said sidewalls,* wherein said frame is made of a strong rigid [plastics] *plastic* material.

13. A lacrosse stick head according to claim 12 wherein each of said sidewalls includes an upper wall section and a lower wall section, the latter having an inner wall segment and an outer wall segment, said inner wall segment extending inwardly towards said longitudinal axis and being shorter than said outer wall segment.

14. A lacrosse stick head according to claim 13 wherein each inner wall segment extends both inwardly and downwardly from said upper wall section and has an inner edge and holes therein proximate said inner edge, said holes in the inner edge being provided for optionally attaching said netting to the inner wall segments.

15. A lacrosse stick head according to claim 13 wherein each inner wall segment extends both inwardly and downwardly from said upper wall section and has an inner edge and wherein substantial portions of the two inner edges are generally parallel to one another and are spaced apart a distance in the range of 2½ inches to 3 inches.

16. A lacrosse stick head according to claim 17 wherein the outer wall segments have substantially straight bottom edges that are parallel to an upper edge plane defined by the upper edges of said sidewalls located in a region thereof adjacent and at said throat portion of said frame.

* * * * *